Feb. 19, 1924.
H. W. BUNDY
UPSET TUBE FITTING
Filed Nov. 16, 1922
1,484,295
Fig. 1
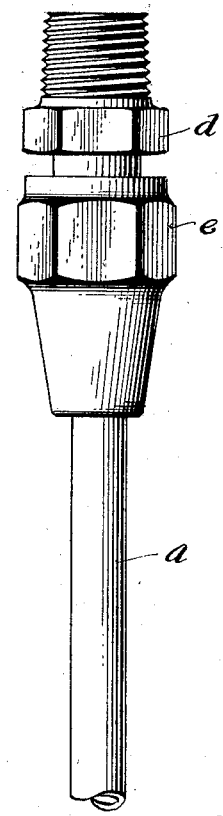
Fig. 2
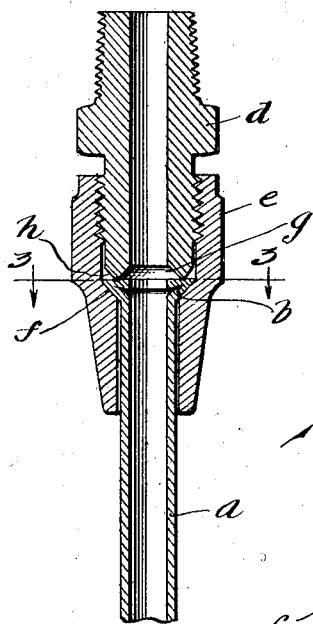
Fig. 4
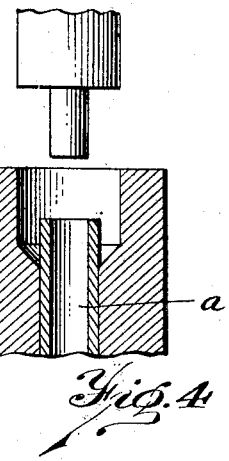
Fig. 5
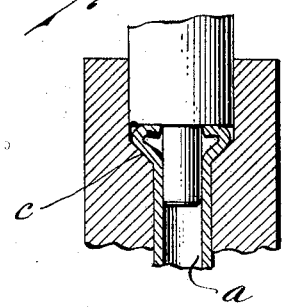
Fig. 7
Fig. 3
Fig. 6
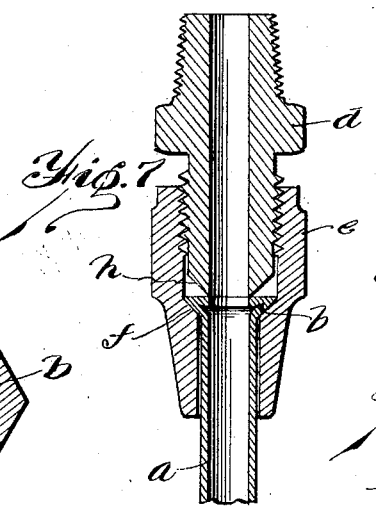
Inventor
Harry W. Bundy
By Stuart C. Barnes
Attorney Patented Feb. 19, 1924.

1,484,295

UNITED STATES PATENT OFFICE.

HARRY W. BUNDY, OF DETROIT, MICHIGAN.

UPSET-TUBE FITTING.

Application filed November 16, 1922. Serial No. 601,387.

*To all whom it may concern:*

Be it known that HARRY W. BUNDY, a citizen of the United States, residing at Detroit, in the county of Wayne and State of Michigan, has invented certain new and useful Improvements in Upset-Tube Fittings, of which the following is a specification.

This invention relates to pipe unions in which an upset tube is adapted to fit in a standard Society of Automobile Engineers' fitting. An object of the present invention is to construct a tube member with upset ends, which is considerably stronger than a tube with flared ends.

A further object is to so construct the nipple that it will bite into the end of the upset tube providing a better connection than is obtainable with a flared tube.

In a flaring tube, the metal is stretched and made harder resulting in a more brittle metal. This often causes the metal to crack when flared. Furthermore the flared portion is thinner and therefore the strength of the metal is decreased. It is impossible to flare the ends of a brass tube and some other alloys with any degree of success. A copper tube can be flared but it is desirable to use a brass tube which is stronger and cheaper. I use a brass tube in the standard Society of Automobile Engineers' fitting which is so constructed as to receive a flared tube. Instead of using a flared tube in the Society of Automobile Engineers' fitting whose flared portion is thinner and weaker, I use an upset tube which provides an end that is thicker and stronger.

In the drawings:

Fig. 1 is an elevation of the tube and a standard Society of Automobile Engineers' fitting.

Fig. 2 is a section thru the same, showing the fitting countersunk to provide a beveled edge.

Fig. 3 is a section on the line 3—3 of Fig. 2.

Figs. 4 to 6 inclusive show the method of upsetting the ends of the tube.

Fig. 7 is a view similar to Fig. 2 showing a standard Society of Automobile Engineers' fitting.

A tube $a$ preferably made of brass or other metal, has the upset end or head $b$. This upset end or head is formed by the usual process of upsetting as is shown in Figs. 4 to 6 inclusive, but it is so upset as to provide a tapered surface $c$ on the lower side of the upset end.

The standard Society of Automobile Engineers' fitting or union consists of two parts $d$ and $e$, one screwed into the other. The socket part $e$ is provided with the tapered shoulder $f$ which is normally adapted to receive the end of a flared tube. The bevelled surface $c$ on the upset tube is adapted to engage with this bevelled shoulder $f$, of the standard Society of Automobile Engineers' socket. The nipple part $d$ of the Society of Automobile Engineers' fitting is provided with a countersunk end $g$. This provides a sharp ridge which will bite into the upset end of the tube when the two parts $d$ and $e$ of the Society of Automobile Engineers' fitting are screwed down tight, clamping the upset and flanged end of the tube against the shoulder $f$.

A union is thus provided which is obviously stronger than one in which a flared tube is used. In addition the circular ridge resulting from said counter-sinking operation enables the union to be drawn down tighter providing a better liquid tight joint than can be obtained with the use of a flared tube.

What I claim is:

1. In a pipe union, the combination of a coupling comprising a nipple part and a socket part provided with a bevelled seat and which engage each other, and a tube having its end folded over and upset to form a crowded-together thickened portion bevelled on the outside complementary to said bevelled seat in the socket, the said upset end of the tube being forced against the seat of the socket when the nipple part and the socket part are engaged.

2. In a pipe union, the combination of a coupling provided with a socket part and a nipple part that engage each other, the said socket part being provided with a seating portion, the nipple portion being provided in its inner end with a relatively sharp ridge, and a tube provided with a crowded-together thickened end, the said ridge of the nipple being arranged to bite into the substance of the thickened head when the socket and nipple parts are engaged together.

3. In a pipe union, the combination of a coupling provided with a socket part and a nipple part, the socket part being provided with a seating portion and the nipple part being provided with a ridge, a tube having a folded over end forming a crowded-together thickened flange, the said ridge arranged to bit into the substance of the thickened flange when the nipple and socket parts are engaged.

4. In a pipe union, the combination of a coupling having a socket part and a nipple part that screw together, the socket part being provided with a seating portion and the nipple provided with a bevelled and countersunk inner end, and forming a relatively sharp ridge, a tube having its end folded in to form a thickened head, the said tube arranged to seat on the seating portion of the socket part, and the said ridge arranged to bite into the substance of the thickened head when the coupling parts are screwed together.

5. In a pipe union, the combination of a coupling having a socket part provided with a bevelled seat and a nipple part having a bevelled inner end that is also countersunk to form a relatively sharp ridge, the said coupling parts screwing together, and a tube having its end folded over and upset to provide a bevelled portion complementary to the seat of the socket and a thickened portion, the said ridge of the nipple arranged to bite into said thickened portion when the coupling parts are screwed together.

6. In a pipe union, the combination of a coupling comprising a nipple part and a socket part provided with a bevelled seat and which engage each other, and a tube composed of tough and comparatively hard metal and having its end upset under pressure to form a thickened flange on the end thereof the outside portion of said thickened flange formed with a beveled surface complementary to said beveled seat in the socket, the said upset end of the tube being forced against the seat of the socket when the nipple part and the socket part are screwed together.

7. In a pipe union, the combination of a socket part provided with openings therethrough of two different diameters formed by a tapered shoulder, a tube having its end upset and folded in to form a thickened head of greater diameter than the main portion of the tube, tapered on the side that joins the tube and abrupt on the outer end, and a nipple screwing into the socket part and provided with a sharp end arranged to bite into an intermediate portion of the abrupt end of the head and also force the tapered side of the head into wedging engagement with the tapered shoulder of the socket part.

8. In a pipe union, the combination of a socket part provided with openings therethrough of two different diameters joined by a tapered shoulder, a tube having its end upset and folded in to form a thickened head of greater diameter than the main portion of the tube, tapered on the side that joins the tube and abrupt on the outer end and a nipple arranged to engage in the socket part and provided with an end which can be forced against the abrupt face of the tube head to make a joint at this point and also force the tapered portion of the head against the tapered shoulder of the socket to form a seal.

In testimony whereof I affix my signature.

HARRY W. BUNDY.